United States Patent
Endo et al.

(10) Patent No.: US 10,319,102 B2
(45) Date of Patent: Jun. 11, 2019

(54) IMAGE PROCESSING APPARATUS, IMAGE PROCESSING SYSTEM, IMAGE PROCESSING METHOD, AND STORAGE MEDIUM

(71) Applicant: CANON KABUSHIKI KAISHA, Tokyo (JP)

(72) Inventors: Takaaki Endo, Urayasu (JP); Kiyohide Satoh, Kawasaki (JP); Yasufumi Asao, Atsugi (JP); Yohei Hashizume, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 15/379,353

(22) Filed: Dec. 14, 2016

(65) Prior Publication Data

US 2017/0169579 A1 Jun. 15, 2017

(30) Foreign Application Priority Data

Dec. 15, 2015 (JP) .................. 2015-244647

(51) Int. Cl.
| | |
|---|---|
| G06K 9/00 | (2006.01) |
| G06T 7/35 | (2017.01) |
| G06T 7/11 | (2017.01) |
| G06T 3/00 | (2006.01) |
| G06T 7/00 | (2017.01) |

(52) U.S. Cl.
CPC .............. *G06T 7/35* (2017.01); *G06T 3/0081* (2013.01); *G06T 7/0012* (2013.01); *G06T 7/11* (2017.01);
(Continued)

(58) Field of Classification Search
CPC . G06T 7/35; G06T 7/11; G06T 7/0012; G06T 7/33; G06T 7/0028; G06T 3/0081; G06T 11/00; G06T 19/00; G06T 2200/24; G06T 2207/10081; G06T 2207/10088; G06T 2207/10132; G06T 2210/41; G06T 11/003; G06T 11/006; G06T 11/008; G06T 15/20; G06T 5/50; G06T 3/0068; G06T 7/73; G06T 7/30; G06T 7/38; G06T 2207/10064; G06T 2211/412; G06T 2211/428; G06T 2211/436; G06T 2211/421; A61B 5/0037; A61B 5/055; A61B 5/035; A61B 5/7425; A61B 6/032;
(Continued)

(56) References Cited

U.S. PATENT DOCUMENTS

| | | | | |
|---|---|---|---|---|
| 9,240,046 B2* | 1/2016 | Carrell | ...................... | G06T 7/73 |
| 2003/0144589 A1* | 7/2003 | Roell | ..................... | A61B 5/055 |
| | | | | 600/410 |

(Continued)

*Primary Examiner* — Jose L Couso
(74) *Attorney, Agent, or Firm* — Canon U.S.A., Inc. IP Division

(57) ABSTRACT

An image processing apparatus according an exemplary embodiment of the present invention estimates for a plurality of positions in a target image an estimated value of an error in registration for acquiring a third three-dimensional image by deforming at least one of a first three-dimensional image of a subject and a second three-dimensional image, one of the three-dimensional images being the target image, designates a cross section in the target image, acquires a statistical value of the error in the designated cross section based on the estimated value estimated for a plurality of positions in the cross section, and displays the statistical value.

15 Claims, 11 Drawing Sheets

(52) U.S. Cl.
CPC ............... *G06T 2207/10012* (2013.01); *G06T 2207/30068* (2013.01)

(58) Field of Classification Search
CPC ......... A61B 6/037; A61B 6/463; A61B 6/487; A61B 6/5235; A61B 6/5247; A61B 8/463; A61B 2090/364; A61B 2090/3995; A61B 6/5223; A61B 6/5229; A61B 8/5238; A61B 2576/00; G06F 19/321; G06K 9/32
See application file for complete search history.

(56) References Cited

U.S. PATENT DOCUMENTS

| | | | |
|---|---|---|---|
| 2007/0003123 A1* | 1/2007 | Fu | A61N 5/1049 382/131 |
| 2010/0128954 A1* | 5/2010 | Ostrovsky-Berman | G06T 7/11 382/131 |
| 2011/0040169 A1* | 2/2011 | Kamen | A61B 6/037 600/411 |
| 2012/0155734 A1* | 6/2012 | Barratt | G06T 7/344 382/131 |
| 2013/0094745 A1* | 4/2013 | Sundar | G06T 3/0068 382/132 |
| 2014/0037177 A1 | 2/2014 | Endo | |
| 2014/0148690 A1* | 5/2014 | Kim | A61B 6/5264 600/424 |
| 2015/0182191 A1* | 7/2015 | Caluser | A61B 8/5246 600/440 |
| 2017/0164931 A1* | 6/2017 | Ng | A61B 8/5261 |
| 2017/0178349 A1* | 6/2017 | Ketcha | G06T 7/337 |
| 2017/0354342 A1* | 12/2017 | Ben-Yishai | A61B 5/055 |
| 2018/0040147 A1* | 2/2018 | Alhrishy | G06T 11/008 |
| 2018/0197307 A1* | 7/2018 | Tomioka | G06K 9/00664 |

* cited by examiner

IMAGE PROCESSING APPARATUS, IMAGE PROCESSING SYSTEM, IMAGE PROCESSING METHOD, AND STORAGE MEDIUM

BACKGROUND

Field of the Disclosure

The present disclosure relates to an image processing apparatus, an image processing system, an image processing method, and a storage medium.

Description of the Related Art

In image diagnosis using medical images, there are cases where a plurality of images of a subject captured in different postures thereof at different times by different imaging apparatuses, using different imaging parameters, is compared. In some cases, registration between different images is performed in order to compare lesion portions more accurately. In general, image registration includes errors. United States Patent Application Publication No. 2014/0037177 discusses displaying a region to which a registration error range is added, in an estimated position of a point on a second image which corresponds to a point of interest on a first image. However, from the local registration errors in the corresponding points alone, it is difficult to understand an overall trend in registration errors in a target cross section.

SUMMARY

According to some embodiments of the present disclosure, an image processing apparatus includes an estimated value acquisition unit configured to acquire an estimated value of an error in registration between a plurality of three-dimensional images, a designating unit configured to designate a target cross section in one of the plurality of three-dimensional images and the registered three-dimensional image, a statistical value acquisition unit configured to acquire a statistical value of the estimated value of a plurality of positions in the target cross section, and a display control unit configured to display the statistical value on a display unit.

Further features of the present disclosure will become apparent from the following description of exemplary embodiments with reference to the attached drawings.

DESCRIPTION OF THE EMBODIMENTS

Various exemplary embodiments of the disclosure will be described below with reference to the drawings.

The following describes a first exemplary embodiment. In the first exemplary embodiment, deformable registration is performed in which a first three-dimensional image of a subject is deformed so that a position and a shape in the first three-dimensional image coincide with a position and a shape in a second three-dimensional image. The following describes an example in which estimated values of errors in a third three-dimensional image and statistical values are acquired. The third three-dimensional image is a deformed image acquired as a result of the deformable registration. In the first exemplary embodiment, a case will be described in which the first three-dimensional image is registered to the second three-dimensional image in advance. In other words, in the first exemplary embodiment, deformation information (hereinafter, "deformation parameter") about deformation between the first and second three-dimensional images is acquired in advance. Further, in the first exemplary embodiment, an error image indicating an estimated value of a registration error in each voxel position on the third three-dimensional image is generated in advance as information about errors in registration between the first and second three-dimensional images. The error image refers to a three-dimensional image with voxel values each indicating an estimated value of a registration error in the voxel position.

Figure 1:
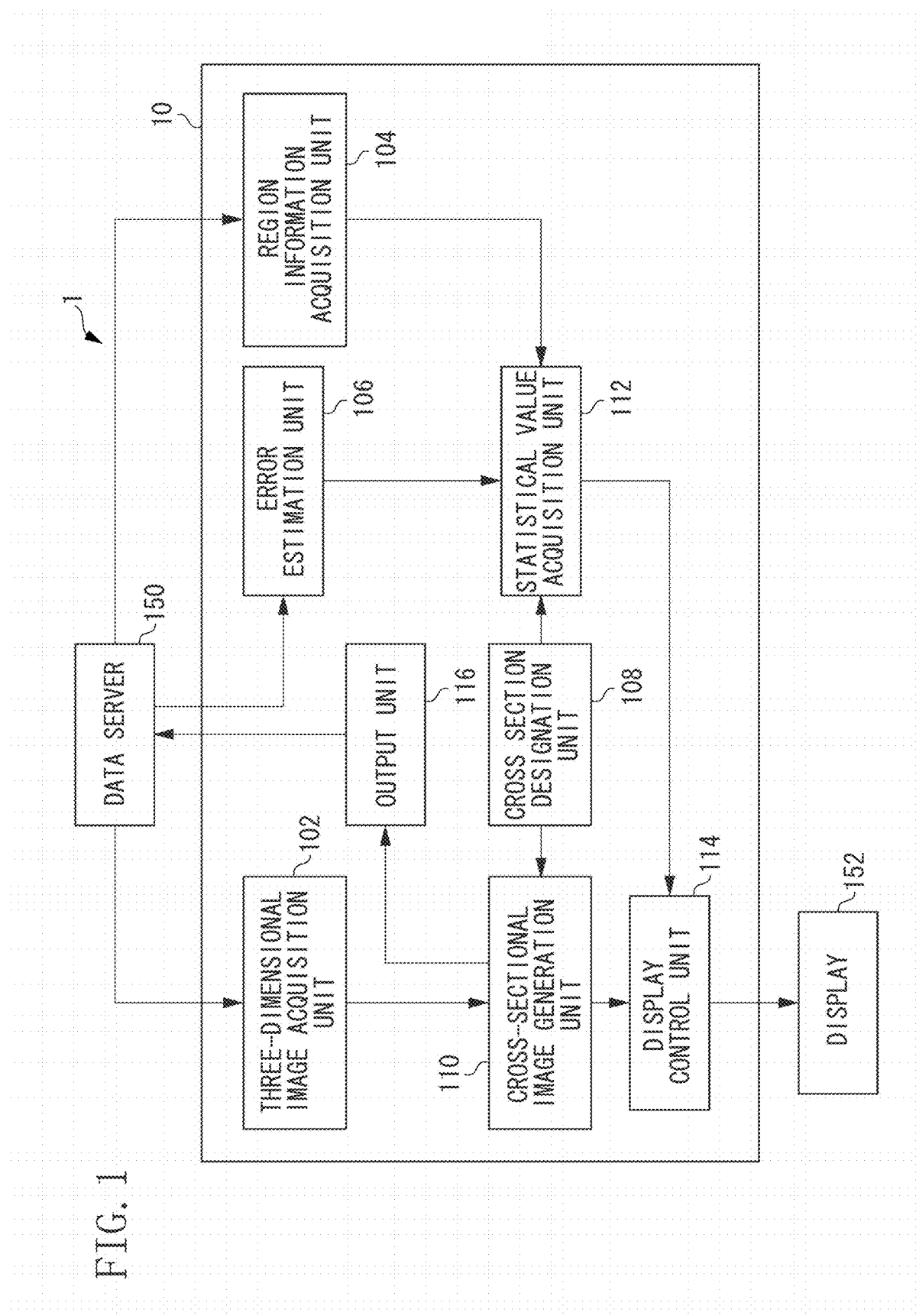
FIG. 1 illustrates an example of a functional configuration of an image processing apparatus according to one or more aspects of the present.

FIG. 1 illustrates an example of a functional configuration of an image processing apparatus according to the first exemplary embodiment. The image processing apparatus according to the first exemplary embodiment is an image processing apparatus 10 illustrated in FIG. 1. An information system 1 includes the image processing apparatus 10, a data server 150, and a display 152.

The data server 150 stores first and second three-dimensional images of a subject. Further, the data server 150 stores deformation parameters about deformation between the first and second three-dimensional images. Further, the data server 150 stores a third three-dimensional image (hereinafter, "deformed image") acquired by deforming the first three-dimensional image such that a position and a shape in the first three-dimensional image coincide with a position and a shape in the second three-dimensional image. Further, the data server 150 stores an error image of the deformed image. Each of the three-dimensional images includes, as supplementary information, the image size, resolution, type of the imaging apparatus (hereinafter, "modality") with which the three-dimensional image is captured, imaging information, case information, and correspondence information between the images. The imaging information refers to information indicating, for example, imaging parameters of the three-dimensional image, an imaged region, and a body posture. The case information refers to, for example, patient information, examination information, diagnosis information, organ region information, and region-of-interest information. The foregoing supplementary information is transmitted to the image processing apparatus 10 as needed together with the image.

The display 152 is an example of a display unit. The display 152 is, for example, a liquid crystal display. The display 152 displays a screen controlled by a display control unit 114 of the image processing apparatus 10.

The image processing apparatus 10 includes a three-dimensional image acquisition unit 102, a region information acquisition unit 104, an error estimation unit 106, a cross section designation unit 108, a cross-sectional image generation unit 110, a statistical value acquisition unit 112, a display control unit 114, and an output unit 116.

The three-dimensional image acquisition unit 102 acquires the second three-dimensional image of the subject and a deformed image from the data server 150.

The region information acquisition unit 104 acquires information about a region of interest in the second three-dimensional image. In the first exemplary embodiment, the region information acquisition unit 104 acquires as region-of-interest information a label image representing an internal region of the subject inside the surface of the subject. Further, the region information acquisition unit 104 sets an arbitrary region such as a cuboid region or spherical region as a region of interest if a user instruction is given.

The error estimation unit 106 acquires from the data server 150 an error image as information about errors in registration between the first and second three-dimensional images. The error image indicates a distribution of estimated values of registration errors in respective voxel positions in the deformed image. The error image may be an image generated by any publicly-known method. For example, the error image can be generated by providing a large number of true corresponding points between the first and second three-dimensional images and interpolating errors (residual errors) between the corresponding points after the deformation. Further, in a case where deformation information is acquired based on the corresponding points between the images, a method can be used in which an estimated error according to the distance from the closest corresponding point (e.g., in proportion to the distance) is set to each voxel position. Further, a method can be used in which an error is estimated from ambiguity of a solution based on differences in displacement in respective voxel positions between two different registration methods. Examples of two different registration methods that can be used include a free-form deformation (FFD) method and thin-plate spline (TPS) method.

The cross section designation unit 108 designates a cross section along which the three-dimensional image is to be cut, based on information input by a user operation. The cross section designation unit 108 designates especially a cross section of the deformed image. A user can input the foregoing operation using an operation unit 1109 illustrated in FIG. 11.

The cross-sectional image generation unit 110 generates a cross-sectional image of the second three-dimensional image and a cross-sectional image of the deformed image along the designated cross section. In the first exemplary embodiment, a cross section has a predetermined thickness (hereinafter, referred to as "slab thickness").

The statistical value acquisition unit 112 acquires information indicating an overall trend in errors in the cross section designated in the deformed image, based on acquired registration error information. As used herein, the registration error information refers to an estimated error value. Further, the information indicating an overall trend in errors in the designated cross section refers to a statistical value of an estimated error value of the cross section.

The display control unit 114 performs control to display the respective cross-sectional images of the second three-dimensional image and the deformed image on the display 152. Further, the display control unit 114 performs control to display an acquired error statistical value in association with the cross-sectional images on the display 152. Further, the display control unit 114 performs control to display on the display 152 a screen for notifying a user of information.

The output unit 116 outputs to the data server 150 the cross-sectional images generated by the cross-sectional image generation unit 110 and the error statistical value acquired by the statistical value acquisition unit 112. At this time, the output unit 116 may output the statistical value so that the cross-sectional images and the statistical value can be stored in association with each other on the data server 150. Further, the output unit 116 may output the images and the statistical value based on operation input by a user or may automatically output the images and the statistical value.

Figure 11:
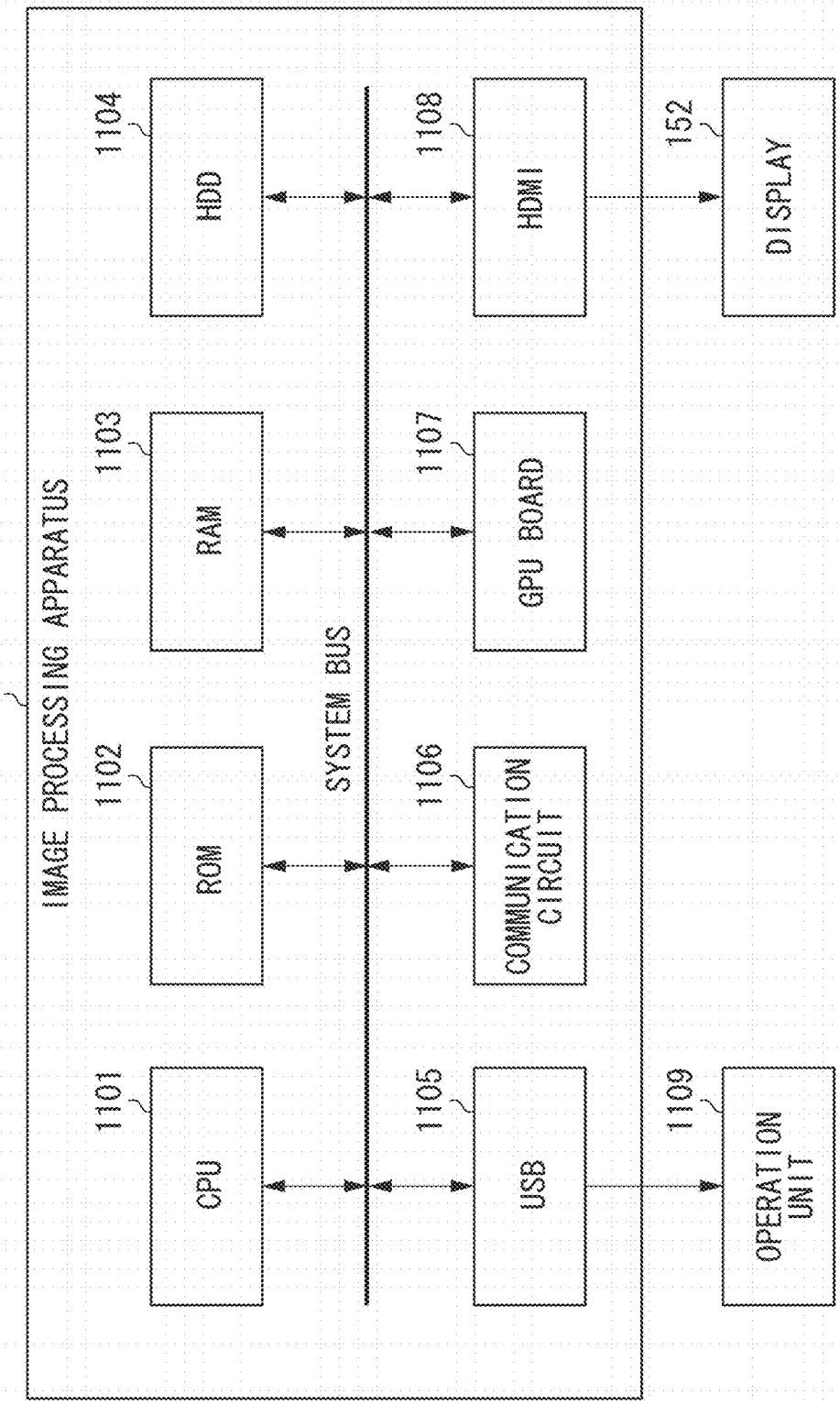
FIG. 11 illustrates an example of a hardware configuration of an image processing apparatus according to one or more aspects of the present disclosure.

FIG. 11 illustrates an example of a hardware configuration of the image processing apparatus 10. The image processing apparatus 10 includes a central processing unit (CPU) 1101, a read-only memory (ROM) 1102, a random access memory (RAM) 1103, a hard disk drive (HDD) 1104, a universal serial bus (USB) 1105, a communication circuit 1106, a graphics processing unit (GPU) board 1107, and a high-definition multimedia interface (HDMI) (registered trademark) 1108. The foregoing devices are connected to one another via an internal bus so that the devices can communicate with one another.

The CPU 1101 is a control circuit configured to comprehensively control the image processing apparatus 10 and a unit connected to the image processing apparatus 10. The CPU 1101 executes a program stored on the ROM 1102 to perform control. Further, the CPU 1101 executes a display driver that is software for controlling the display 152, thereby performing display control on the display 152. Further, the CPU 1101 performs input/output control on the operation unit 1109.

The ROM 1102 stores data and a program storing a procedure of control that is performed by the CPU 1101.

The RAM 1103 is a memory for storing a program for executing processing in the image processing apparatus 10 and a unit connected to the image processing apparatus 10 and various types of parameters for use in image processing. The RAM 1103 stores a control program that is executed by the CPU 1101, and temporarily stores various types of data for use when the CPU 1101 executes various types of control.

The HDD 1104 is an auxiliary storage device configured to store various types of data such as X-ray image data.

The USB 1105 is connected to the operation unit 1109.

The communication circuit 1106 is a circuit for performing communication with a unit included in the information system 1. The communication circuit 1106 may be realized by a plurality of configurations according to one or more communication form.

The GPU board 1107 is a general-purpose graphics board including a GPU and a video memory. The GPU board 1107 enables to perform calculations in image processing and display images at high speed without dedicated hardware. In the first exemplary embodiment, since the deformed image and the error image are acquired from the data server 150, the image processing apparatus 10 does not have to include the GPU board 1107.

The HDMI (registered trademark) 1108 is connected to the display 152.

Figure 2:
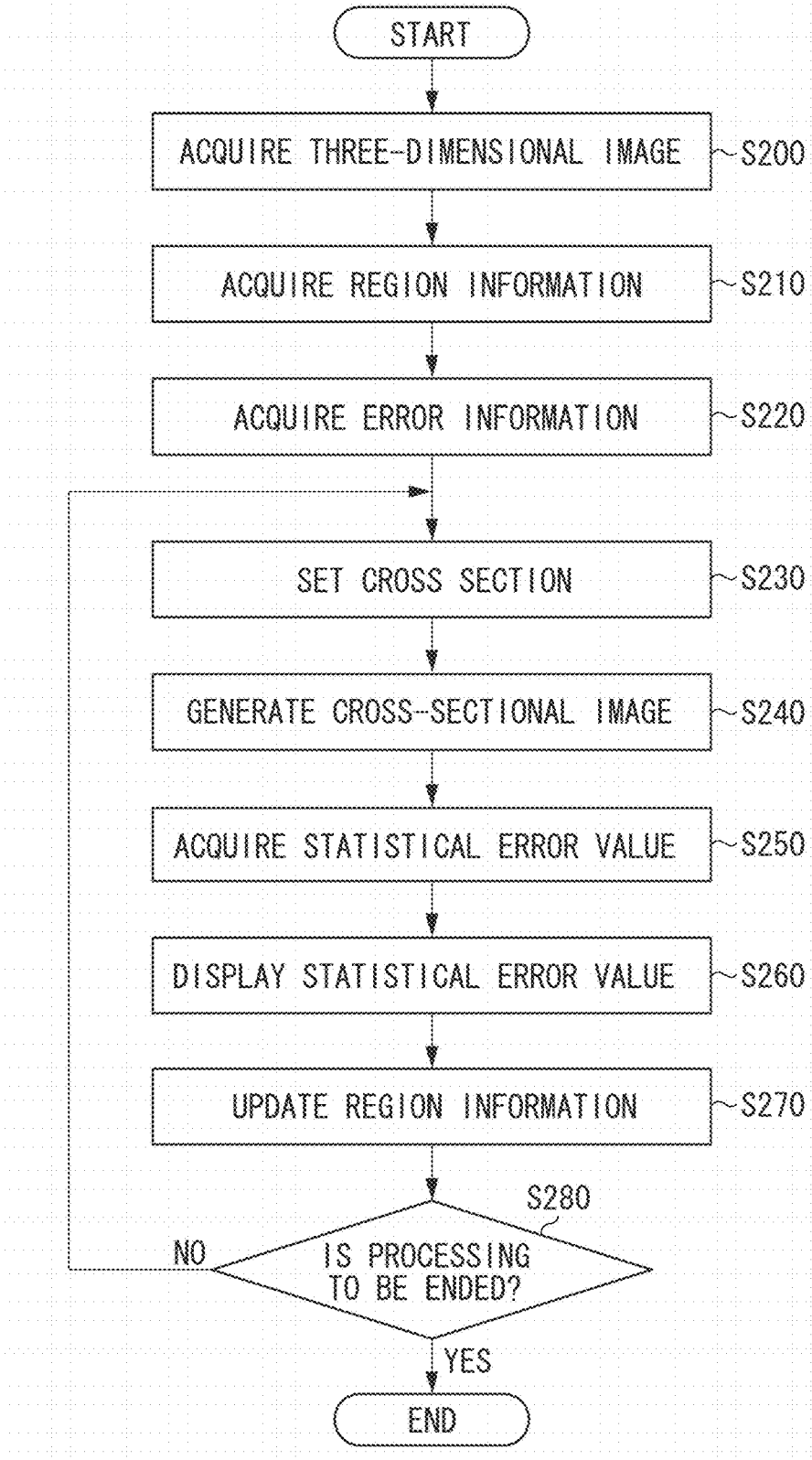
FIG. 2 is a flow chart illustrating an example of processing performed by the image processing apparatus according to one or more aspects of the present disclosure.

FIG. 2 is a flow chart illustrating an example of processing executed by the image processing apparatus 10. The image processing apparatus 10 executes the processing illustrated in FIG. 2 to acquire and display statistical values of errors in a designated cross section of a deformed image. The following describes the processing in detail.

In step S200, the three-dimensional image acquisition unit 102 acquires the second three-dimensional image and the deformed image of the subject from the data server 150. Then, the three-dimensional image acquisition unit 102 transmits the acquired images to the cross-sectional image generation unit 110. In the present exemplary embodiment, the deformed image, i.e., the third three-dimensional image, is a target image.

In step S210, the region information acquisition unit 104 acquires, as information about a region of interest in the second three-dimensional image, a label image (three-dimensional image) representing an internal region inside the surface of the subject. In this way, a region contained in the target image is specified as a region of interest. From this point of view, the region information acquisition unit 104 functions as an example of a specifying unit. Then, the region information acquisition unit 104 transmits the acquired information to the statistical value acquisition unit 112. This processing is performed using a publicly-known image processing method such as binarization in which an internal region of a subject is extracted from a three-dimensional image. In a case where the data server 150 stores in advance the information about an internal region of the subject in the deformed image, the information may be acquired from the data server 150. In a case where a diagnosis target can be limited to a site/organ in the three-dimensional image, an organ region in which the organ is extracted from the three-dimensional image by a publicly-known method may be set as a region of interest. The acquisition of a region of interest may be performed by image processing on the deformed image.

In step S220, the error estimation unit 106 acquires from the data server 150 an error image as information about errors in registration between the first and second three-dimensional images. From this point of view, the error estimation unit 106 functions as an example of an estimated value acquiring unit. Then, the error estimation unit 106 transmits the acquired error image to the statistical value acquisition unit 112.

In step S230, the cross section designation unit 108 designates cross sections along which the three-dimensional images acquired in step S200 are to be cut respectively, based on a user operation input via the operation unit 1109. From this point of view, the cross section designation unit 108 functions as an example of a designating unit. Then, the cross section designation unit 108 transmits information about the designated cross sections to the cross-sectional image generation unit 110 and the statistical value acquisition unit 112.

For example, an axial cross section passing through a center of the three-dimensional image is set in an initial state, and at the press of a predetermined key by a user, the position of the axial cross section is shifted by a predetermined distance in a normal direction of the cross section. For example, at the press of an "f" key, the position of the cross section is shifted by 1 mm in the normal direction of the cross section, and at the press of a "b" key, the position of the cross section is shifted by 1 mm in a direction opposite to the direction in which the position is shifted at the press of the "f" key. Further, at the press of a predetermined key by the user, the slab thickness of the cross section is set. For example, at the press of a "D" key, the thickness of the cross section is increased by 1 mm, and at the press of a "d" key, the thickness of the cross section is decreased by 1 mm. The thickness can be set to 0 mm. In a case where a plurality of three-dimensional images is displayed in step S260 described below, respective cross sections may be set separately for the three-dimensional images, or may a common cross section may be set for the three-dimensional images in conjunction with one another. However, in a case where the cross-sectional images are to be superimposed and displayed, it is desirable to set a common cross section for the three-dimensional images.

In step S240, the cross-sectional image generation unit 110 generates a cross-sectional image of the second three-dimensional image acquired in step S200 and a cross-sectional image of the deformed image acquired in step S200. The cross-sectional images are two-dimensional images respectively generated by cutting along the cross sections designated in step S230. From this point of view, the cross-sectional image generation unit 110 functions as an example of a generating unit. Further, with regard to the second three-dimensional image and the deformed image that are target images, the cross sections designated in step S230 are set as target cross sections. Specifically, the cross-sectional image generation unit 110 generates two-dimensional images of the target cross sections. In a case where the thickness set in step S230 is larger than 0 mm, the cross-sectional image generation unit 110 performs the following processing on the cross sections set in step S230. Specifically, the cross-sectional image generation unit 110 generates, as the cross-sectional images, projection images onto which representative values of voxel values of the three-dimensional images within the range of the thickness (within the slab) set in step S230 are projected. The representative values are, for example, maximum and minimum values of luminance values. In other words, the cross-sectional image generation unit 110 generates projection images onto which the representative values within the predetermined thickness range in the target images are projected. Examples of the images onto which the maximum values of the voxel values of the three-dimensional images are projected include a maximum intensity projection (MIP) image and a slab MIP image. Examples of the images onto which the minimum values of the voxel values of the three-dimensional images are projected include a minimum intensity projection (MinIP) image and a slab MinIP image. Then, the cross-sectional image generation unit 110 transmits the generated cross-sectional images to the display control unit 114.

In step S250, the statistical value acquisition unit 112 acquires statistical values of the estimated registration error values (hereinafter, "statistical error values") acquired in step S220 with regard to an intersection region where the cross section set for the deformed image and the region of interest intersect. Then, the statistical value acquisition unit 112 transmits the acquired information to the display control unit 114.

Specifically, the statistical value acquisition unit 112 first acquires an intersection region that is a region where the cross section set with respect to the deformed image in step S230 and the label image representing the region of interest acquired in step S210 overlap. However, in a case where the region of interest is changed by processing performed in step S270 described below, the statistical value acquisition unit 112 acquires an intersection region where the region of interest and the cross section intersect. Then, the statistical value acquisition unit 112 acquires the number of voxels N in the intersection region. Next, the statistical value acquisition unit 112 acquires a voxel value of each voxel in the intersection region in the error image, i.e., an estimated error value, and acquires the total T of the acquired estimated error values. Then, the statistical value acquisition unit 112 divides T by N to acquire a mean value of the estimated error values of the region of interest. Similarly, the statistical value acquisition unit 112 acquires statistical error values such as a standard deviation, maximum value, and median value of the estimated error values using a publicly-known method. In a case where the region of interest is not included in the displayed cross section, i.e., a case where there is no intersection region, the statistical value acquisition unit 112 does not perform the acquisition of statistical error values.

Instead of acquiring the statistical values of the estimated error values of all voxels in the intersection region, the statistical values of the estimated error values may be acquired based solely on the estimated error values in the voxel positions based on which the projection images are generated in step S240. In this way, statistical values closer to estimated error values of a site displayed as a projection image can be acquired.

In step S260, the display control unit 114 performs control to display the statistical error values acquired in step S250 on the display 152. In the first exemplary embodiment, the display control unit 114 also performs control to display on the display 152, which is an example of the display unit, the statistical error values in association with the cross-sectional images generated in step S240. From this point of view, the display control unit 114 functions as an example of a display control unit. Examples of a method of displaying the statistical error values in association with the cross-sectional images include a method in which the statistical error values of the cross-sectional image are superimposed on the cross-sectional image of the deformed image, and the superimposed images are displayed on the display 152, which is an example of the display unit. In a case where no error statistical value is acquired in step S250, the display of statistical error values is not performed.

In step S260, the display control unit 114 may perform control to display the cross-sectional images of the second three-dimensional image and the deformed image in such a manner that the cross-sectional images are mutually superimposed, or may perform control to display the cross-sectional images in parallel. Further, the display control unit 114 may acquire a user instruction via a graphical user interface (GUI) (not illustrated) to change how the cross-sectional images are to be displayed, i.e., the cross-sectional images are displayed in a superimposed state, the cross-sectional images are displayed simultaneously, or only one of the cross-sectional images is displayed. At this time, the statistical values of the estimated error values may be displayed only in the case where the cross-sectional images are displayed in a superimposed state or displayed simultaneously. Alternatively, the statistical values of the estimated error values may be displayed only in the case where the cross-sectional image of the deformed image is displayed.

Figure 3:
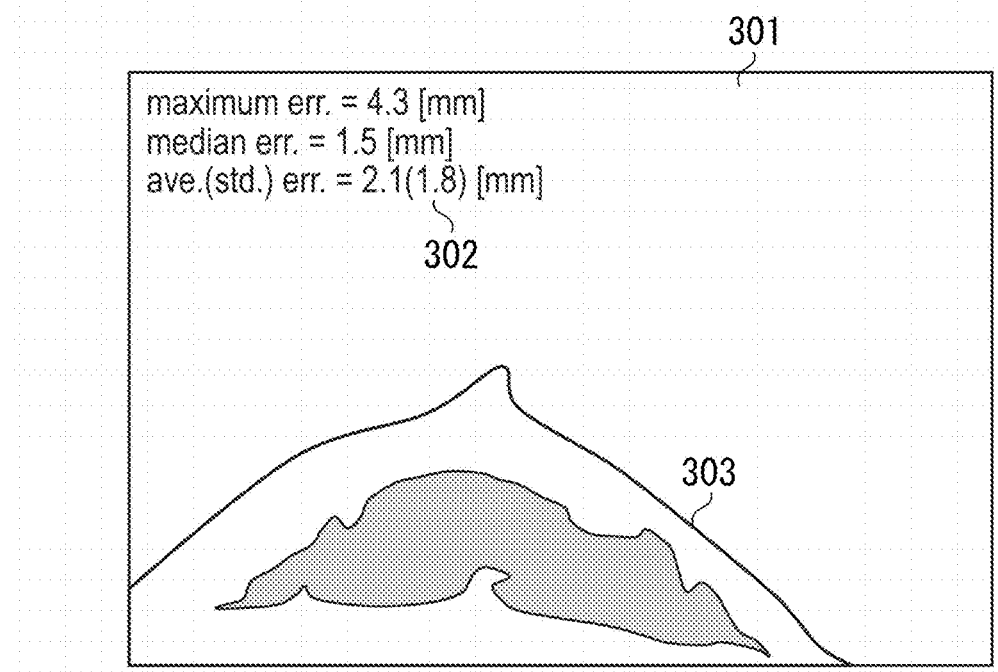
FIG. 3 illustrates an example of a screen displayed by the image processing apparatus according to one or more aspects of the present.

FIG. 3 illustrates an example of a cross-sectional image 301 of the deformed image of the subject, statistical error values 302 associated with the cross-sectional image 301, and a region of interest 303, which are displayed on the display 152. FIG. 3 illustrates a case where the subject is a breast. While FIG. 3 illustrates as an example the case where a maximum value, median value, mean value, and standard deviation are displayed as the statistical values of the estimated error values, the statistical values to be displayed are not limited to the foregoing statistical values, and other statistical error values such as a minimum value may be acquired and displayed together. Alternatively, at least one of the plurality of statistical error values may be displayed selectively. Further, a histogram of the estimated error values may be displayed in the form of a graph as an error statistical value.

In step S270, if a user instruction is given to designate a region, the region information acquisition unit 104 performs processing to set the designated region as a new region of interest. In this way, the region of interest is updated. Then, the region information acquisition unit 104 transmits the acquired information to the statistical value acquisition unit 112.

Figure 4:
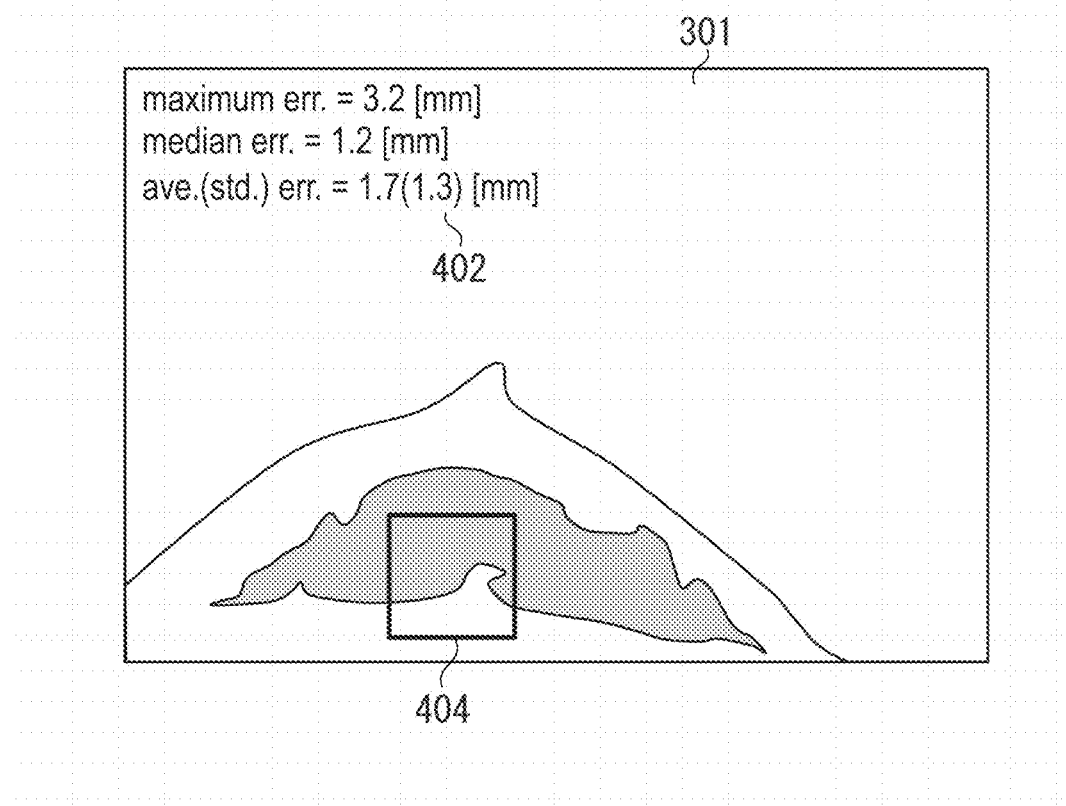
FIG. 4 illustrates an example of a screen displayed by the image processing apparatus according to one or more aspects of the present disclosure.

At this time, the information about the region of interest can be set as a cubic or spherical region in the space of the second three-dimensional image or the deformed image, based on, for example, an operation input via the operation unit 1109 with respect to the displayed cross-sectional image. For example, the foregoing can be realized by a GUI (not illustrated) configured to designate the central coordinates and radius of a sphere on the displayed cross section. FIG. 4 illustrates an example of the display in the case where the region of interest is set as a cube. In FIG. 4, an intersection region 404 indicates a region where the set cross section and the region of interest intersect, and statistical error values 402 indicate the statistical error values of the region of interest. The region of interest may be set as a region (e.g., circle or rectangle having the same thickness as the thickness of the slab) in the currently-displayed cross section. Further, the information about the region of interest may be set using points and lines.

By the foregoing processing performed in step S270, the region of interest acquired in step S210, which is based on an anatomical structure such as an internal region or organ region of a subject, and the region of interest acquired in step S270, which is based on the user-input information, can be switched before and after the user instruction. If a further user instruction is given, processing may be performed to set again, or restore, the region based on the anatomical structure as a region of interest.

Figure 5:
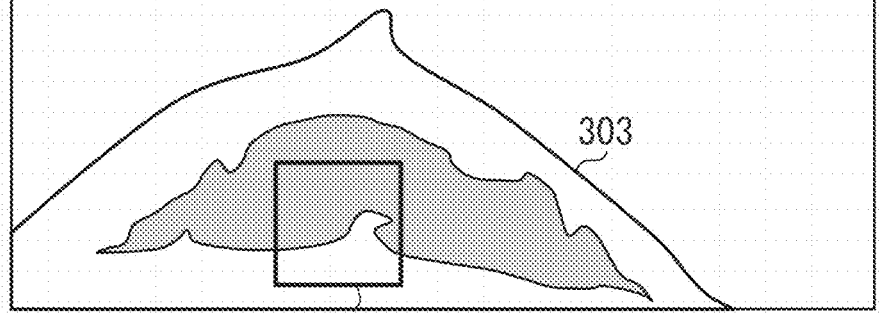
FIG. 5 illustrates an example of a screen displayed by the image processing apparatus according to one or more aspects of the present disclosure.

The region acquired in step S210 and the region acquired in step S270 may both be set simultaneously as regions of interest. In this case, as illustrated in FIG. 5, it is desirable to display both the statistical error values of the respective regions of interest. Further, a plurality of regions of interest may be set based on user-input information, and statistical error values of the respective regions of interest may be displayed. In this case, it is desirable to display only the statistical error values of the region of interest included in the currently-displayed cross section.

In step S280, the image processing apparatus 10 determines whether to end the entire processing. For example, an operator inputs an instruction to end the processing by clicking an end button located on the display 152 with a mouse (not illustrated). If the image processing apparatus 10 determines that the processing is to be ended (YES in step S280), the entire processing of the image processing apparatus 10 is ended. On the other hand, if the image processing apparatus 10 does not determine that the processing is to be ended (NO in step S280), the processing returns to step S230, and processing in steps S230 to S270 is executed again.

In step S280, if an instruction to end the entire processing is given, the output unit 116 may associate the statistical error values with the target image and output the statistical error values and the target image to an external apparatus such as the data server 150. For example, the output unit 116 may output to the data server 150 the statistical error values acquired in step S250 and the region-of-interest information updated in step S270. In this case, the statistical error values and the target image such as the deformed image are associated with each other and stored on the data server 150.

As the foregoing describes, according to the first exemplary embodiment, a registration error statistical value of a designated cross-sectional image can be presented to the user. Further, the error statistical value is displayed together with the cross-sectional image, so that the user can understand with ease how much the displayed cross-sectional image is shifted.

[Modified Example]

While the case in which the estimated values of the registration errors in the respective voxel positions in the deformed image are stored as an error image is described as an example in the first exemplary embodiment, it is not limited thereto, and the estimated values of the registration errors in the respective voxel positions in the second three-dimensional image may be stored as an error image. In this case, in step S250, the statistical value acquisition unit 112 performs processing to acquire statistical values of estimated error values of an intersection region where the cross section set for the second three-dimensional image and the region of interest intersect. Then, in step S260, the display control unit 114 superimposes and displays the statistical error values on the cross-sectional image of the second three-dimensional image. From this point of view, the second three-dimensional image is also a target image.

Further, while the case in which the statistical error values of the region of interest in the three-dimensional image are displayed is described as an example in the first exemplary embodiment, it is not limited thereto, and statistical error values of the entire range of the cross-sectional image may be acquired and presented without taking the region of interest into consideration. Further, the statistical error values to be displayed may be switched between the statistical error values of the intersection region where the displayed cross section and the region of interest intersect and the statistical error values of the entire range of the displayed cross section depending on whether the data server 150 stores region-of-interest information. In either of the cases, when a user sets a region of interest, the statistical error values of the intersection region where the displayed cross section and the region of interest intersect can be displayed. Further, only setting of a region of interest based on an anatomical structure may be allowed, or only setting of a region of interest based on a user operation may be allowed. To compare an overall trend of errors with a trend of errors in a region of interest set by a user, statistical error values of the entire range and statistical error values of the set region of interest may be displayed. In the case where a region of interest is set, only statistical error values of the region of interest may be displayed.

Further, the display control unit 114 may perform control to display corresponding points used in deformable registration together with statistical error values. Corresponding points considered to have small errors in a deformed image and an overall trend in errors in the deformed image are displayed together, so that a user can understand the trend in errors in the deformed image more accurately.

In the first exemplary embodiment, the example is described in which information about the region of interest and the statistical error values is output to an external apparatus such as the data server 150 in step S280. When a two-dimensional image such as a cross-sectional image is generated, the output unit 116 may output the two-dimensional image to the external apparatus. Further, when an error statistical value is acquired, the output unit 116 may output the error statistical value to the external apparatus. At this time, pieces of information for uniquely identifying the first, second, and third three-dimensional images may be added thereto and output to the external apparatus so that the pieces of information and the first, second, and third three-dimensional images can respectively be associated and stored on the external apparatus.

In the first exemplary embodiment, the third three-dimensional image acquired by deforming the first three-dimensional image such that the first three-dimensional image coincides with the second three-dimensional image is set as a target image. The present disclosure is not limited to the foregoing, and registration errors between a third three-dimensional image and a fourth three-dimensional image registered by deforming each of the first and second three-dimensional images may be acquired as an error image. From this point of view, the third and fourth three-dimensional images are target images.

In the first exemplary embodiment, the case is described in which each of the first and second three-dimensional images is an image acquired by an imaging apparatus. The present disclosure is not limited to the foregoing, and an image acquired by registering a processed image acquired by processing an image acquired by the imaging apparatus may be used. The processed image is, for example, an image acquired by converting the coordinate space of a three-dimensional image.

The following describes a second exemplary embodiment. An image display apparatus according to the second exemplary embodiment performs deformable registration processing on first and second three-dimensional images of a subject. Specifically, the image display apparatus acquires a deformation parameter between the first and second three-dimensional images and generates a deformed image (third three-dimensional image) by deforming the first three-dimensional image such that a position and a shape in the first three-dimensional image coincide with a position and a shape in the second three-dimensional image. Then, the image display apparatus displays a cross-sectional image of the second three-dimensional image and a cross-sectional image of the third three-dimensional image in such a manner that the cross-sectional images can be compared. At this time, the image display apparatus according to the second exemplary embodiment acquires statistical error values, i.e., statistical values of estimated values of registration errors in the displayed cross sections and displays the acquired statistical values in association with the cross-sectional images. Since the image display apparatus is configured to perform registration interactively based on correspondence information input by a user, the estimated values of the registration errors and the statistical values of the estimated values are dynamically acquired. In the following description of the image display apparatus according to the second exemplary embodiment, only points that are different from those in the first exemplary embodiment will be described. Detailed description of points that are similar to those described in the first exemplary embodiment and the modified example is omitted by incorporating the above description.

Figure 6:
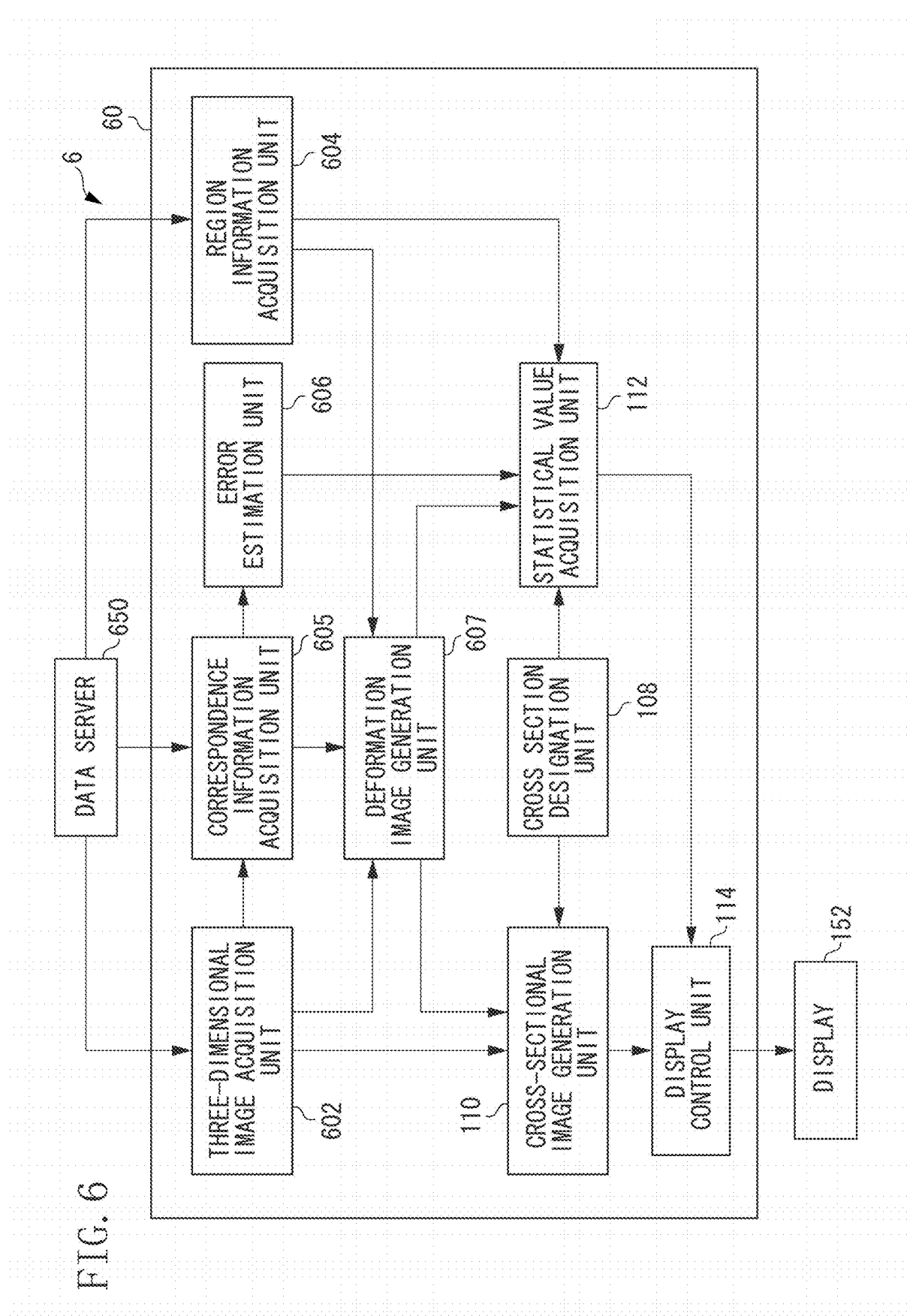
FIG. 6 illustrates an example of a functional configuration of an image processing apparatus according to one or more aspects of the present disclosure.

FIG. 6 illustrates the configuration of an information system 6 according to the second exemplary embodiment. The information system 6 according to the second exemplary embodiment includes an image processing apparatus 60, a data server 650, and the display 152. Portions that are similar to those in FIG. 1 are given the same reference number or symbol, and description of the portions is omitted.

The data server 650 stores first and second three-dimensional images of a subject. Further, the data server 650 stores information about corresponding points between the first and second three-dimensional images as supplementary information about the first and second three-dimensional images. Unlike the first exemplary embodiment, the data server 650 does not store the deformation parameter between the first and second three-dimensional images, the deformed image of the first three-dimensional image, or the error image.

The image processing apparatus 60 includes a three-dimensional image acquisition unit 602, a region information acquisition unit 604, a correspondence information acquisition unit 605, an error information acquisition unit 606, a deformed image generation unit 607, the cross section designation unit 108, the cross-sectional image generation unit 110, the statistical value acquisition unit 112, and the display control unit 114.

The three-dimensional image acquisition unit 602 acquires the first and second three-dimensional images of the subject from the data server 650.

The region information acquisition unit 604 acquires information about a region of interest in the second three-dimensional image, similarly to the region information acquisition unit 104 according to the first exemplary embodiment. Further, the region information acquisition unit 604 sets a region such as a rectangular or spherical region as a region of interest if a user instruction is given. The region information acquisition unit 604 also can acquire a region of interest in the first three-dimensional image, which is processing different from the processing performed by the region information acquisition unit 104 according to the first exemplary embodiment. In this case, when performing the processing to generate the deformed image of the first three-dimensional image, the region information acquisition unit 604 performs similar deformation processing on the region of interest to acquire a deformed region of interest.

The correspondence information acquisition unit 605 acquires from the data server 650 information about corresponding points between the first and second three-dimensional images if the data server 650 stores the information. Further, the correspondence information acquisition unit 605 acquires update information about the corresponding points between the first and second three-dimensional images, i.e., information about addition, change, and deletion, based on user input. The correspondence information acquisition unit 605 is an example of accepting unit to accept a change in correspondence information of the generated cross-sectional image of the target cross section.

The error information acquisition unit 606 acquires an error image indicating a distribution of registration errors in respective voxel positions in the deformed image, based on the currently-acquired information about the corresponding points.

The deformed image generation unit 607 estimates the deformation parameter between the first and second three-dimensional images based on the currently-acquired information about the corresponding points. Then, the deformed image generation unit 607 generates a deformed image by deforming the first three-dimensional image based on the deformation information in such a manner that a position and a shape in the first three-dimensional image coincide with a position and a shape in the second three-dimensional image.

Figure 7:
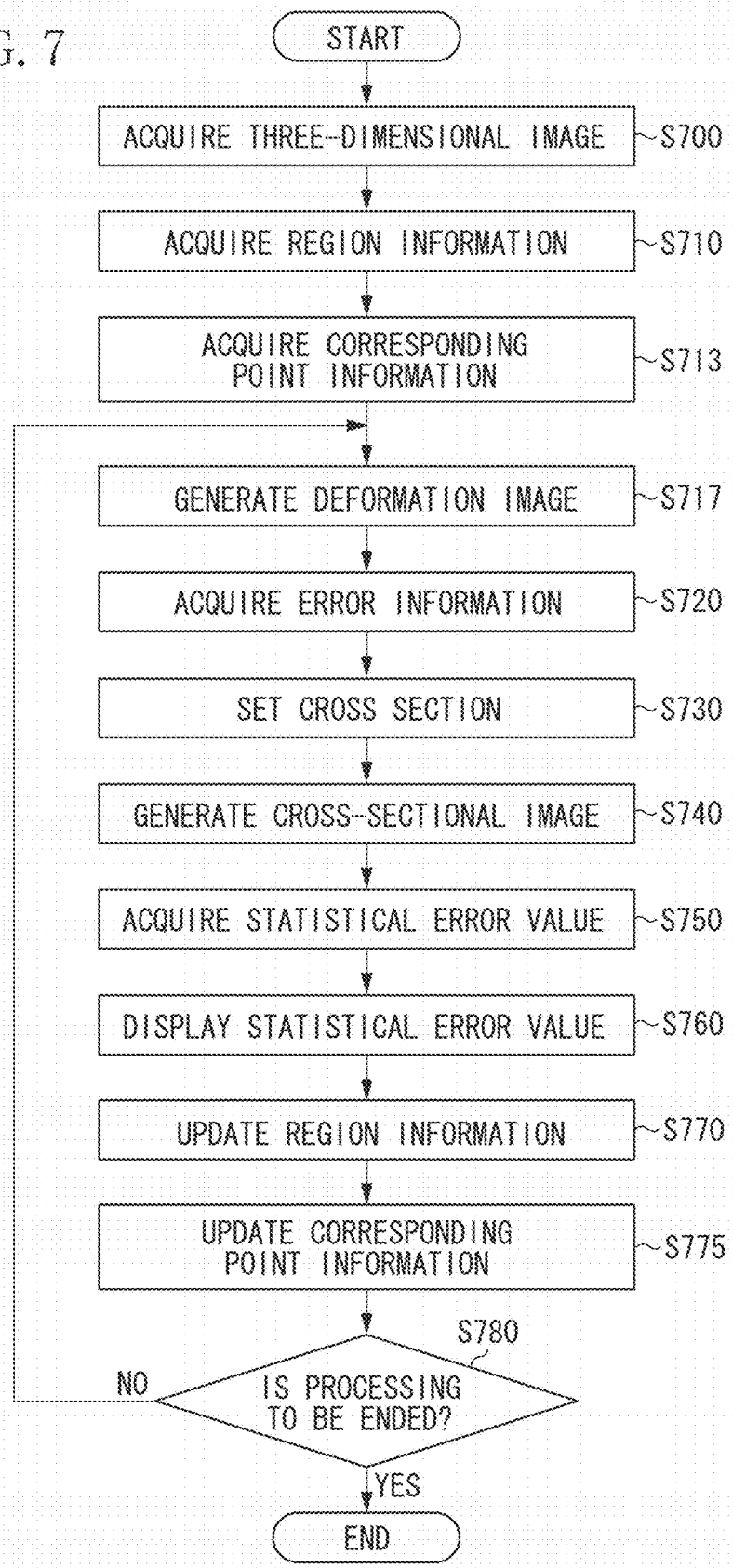
FIG. 7 is a flow chart illustrating an example of processing performed by the image processing apparatus according to one or more aspects of the present disclosure.

FIG. 7 is a flow chart illustrating an example of processing performed by the image processing apparatus 60. The image processing apparatus 60 performs deformable registration processing on the first and second three-dimensional images to acquire the third three-dimensional image. Then, the image processing apparatus 60 designates a cross section of the third three-dimensional image and acquires statistical error values of the designated cross section. Steps S730 to S770 are similar to steps S230 to S270 in the first exemplary embodiment, so description of steps S730 to S770 is omitted.

In step S700, the three-dimensional image acquisition unit 602 acquires the first and second three-dimensional images of the subject from the data server 650. Then, the three-dimensional image acquisition unit 602 transmits the acquired images to the deformed image generation unit 607 and the cross-sectional image generation unit 110.

In step S710, the region information acquisition unit 604 acquires a label image (three-dimensional image) representing a region of interest in the first or second three-dimensional image. Then, if the region of interest is defined in the second three-dimensional image, the region information acquisition unit 604 transmits the acquired information to the statistical value acquisition unit 112. On the other hand, if the region of interest is defined in the first three-dimensional image, the region information acquisition unit 604 transmits the acquired information to the deformed image generation unit 607.

In step S713, the correspondence information acquisition unit 605 acquires from the data server 650 information about corresponding points between the two three-dimensional images acquired in step S700. The information about corresponding points between the images according to the second exemplary embodiment is, for example, positional information about a plurality of corresponding points designated in corresponding positions in the images such as branching parts of a blood vessel. Specifically, the positional information about corresponding points is positional information about points that are commonly contained in both of the first and second three-dimensional images. Then, the correspondence information acquisition unit 605 transmits the acquired information about corresponding points between the images to the deformed image generation unit 607 and the error information acquisition unit 606.

In step S717, the deformed image generation unit 607 performs deformable registration between the first and second three-dimensional images based on the latest corresponding point information designated in step S713 or S775. Specifically, the deformed image generation unit 607 estimates deformation information (hereinafter, "deformation parameter") with which residual errors in the positions of the corresponding points between the first and second three-dimensional images and a cost function including the residual errors are minimized when the first three-dimensional image is deformed under a set condition. Then, the deformed image generation unit 607 generates a deformed image (third three-dimensional image) of the first three-dimensional image by performing coordinate conversion on the first three-dimensional image based on the acquired deformation parameter such that a position and a shape in the first three-dimensional image coincide with a position and a shape in the second three-dimensional image. Then, the deformed image generation unit 607 transmits the generated deformed image to the cross-sectional image generation unit 110.

Further, in the case where the region of interest is defined in the first three-dimensional image, the deformed image generation unit 607 performs coordinate conversion on the region-of-interest information as well based on the deformation information to acquire a deformed region of interest registered to the second three-dimensional image. Then, the deformed image generation unit 607 transmits information about the generated deformed region of interest as region-of-interest information to the statistical value acquisition unit 112.

In a case where not even one corresponding point is acquired, e.g., a case where the data server 150 does not store corresponding point information and no corresponding point is added in step S775, the first three-dimensional image is used as the third three-dimensional image.

In step S720, the error information acquisition unit 606 acquires registration errors in respective voxel positions in the deformed image based on the latest corresponding point information designated in step S713 or S775, and generates an error image indicating a distribution of the registration errors. Then, the error information acquisition unit 606 transmits the generated error image to the statistical value acquisition unit 112. From this point of view, the error information acquisition unit 606 functions as an example of an estimating unit.

Specifically, first, the error information acquisition unit 606 selects a corresponding point as a target of error acquisition from the latest information about the plurality of corresponding points designated in step S713 or S775, and selects the corresponding points excluding the selected corresponding point as correspondence information for use in registration. Next, the error information acquisition unit 606 executes registration processing to register the first and second three-dimensional images based on the selected correspondence information. The registration processing is processing for estimating the deformation of the first three-dimensional image. Then, the error information acquisition unit 606 acquires positional error vectors in the positions of the selected corresponding points, i.e., corresponding points that are not used in the registration processing, from the registration processing result. The positional error vector is a target registration error (TRE). Lastly, the error information acquisition unit 606 interpolates TREs in the respective positions of the corresponding points to acquire registration errors in the position of each voxel. Examples of an interpolation model that can be used in the interpolation include a group of functions in which a radial basis function such as a thin plate spline (TPS) function is arranged in the respective positions of the corresponding points.

In a case where the current corresponding point information does not satisfy a predetermined condition, the error information acquisition processing in step S720 is not performed. For example, in the case where the number of corresponding points is zero, error estimation based on corresponding points cannot be conducted, so that error information is not acquired. Alternatively, no error information may be acquired until the number of corresponding points exceeds a predetermined threshold value. This produces an advantage that error information with low reliability is prevented from being presented to a user.

In step S775, the correspondence information acquisition unit 605 additionally sets information about corresponding points between the first and second three-dimensional images. Specifically, the correspondence information acquisition unit 605 sets positional information about corresponding points such as branching parts of a blood vessel between the respective cross-sectional images generated from the first and second three-dimensional images, based on information input by a user via a mouse (not illustrated). Then, the correspondence information acquisition unit 605 adds the positional information about the designated corresponding points to the positional information about the plurality of corresponding points between the images, which is acquired in step S713. Instead of adding a new corresponding point, an existing corresponding point may be moved or deleted. Then, the correspondence information acquisition unit 605 transmits the acquired information about corresponding points between the images to the deformed image generation unit 607 and the error information acquisition unit 606.

In step S780, the image processing apparatus 60 determines whether the entire processing is to be ended. If the image processing apparatus 60 determines that the entire processing is to be ended (YES in step S780), the entire processing of the image processing apparatus 60 is ended. On the other hand, if the image processing apparatus 60 does not determine that the entire processing is to be ended (NO in step S780), the processing returns to step S717, and the processing in steps S717 to S775 is executed again.

According to the second exemplary embodiment, in a case where registration between images is performed based on correspondence information input by a user, statistical values of estimated values of registration errors can be displayed while being updated. This enables a user to understand with ease a change in a shift in the cross-sectional images based on the input of the corresponding points.

[Modified Example]

In the functional configuration of the image processing apparatus according to the second exemplary embodiment, the output unit is omitted. In a modified example, the image processing apparatus 60 may include the output unit configured to output, to the data server 650, the images generated by the deformed image generation unit 607 and the cross-sectional image generation unit 110 and the statistical error values acquired by the statistical value acquisition unit 112, as in the first exemplary embodiment.

The following describes a third exemplary embodiment. An image display apparatus according to the third exemplary embodiment presents statistical values of estimated values of registration errors in a cross section other than a displayed cross section. More specifically, the image display apparatus is characterized by acquiring statistical values of estimated values of registration errors according to respective distances from a predetermined region. In the third exemplary embodiment, a surface of the subject is used as the predetermined region. In the following description of the image display apparatus according to the third exemplary embodiment, only points that are different from those in the first exemplary embodiment will be described.

Figure 8:
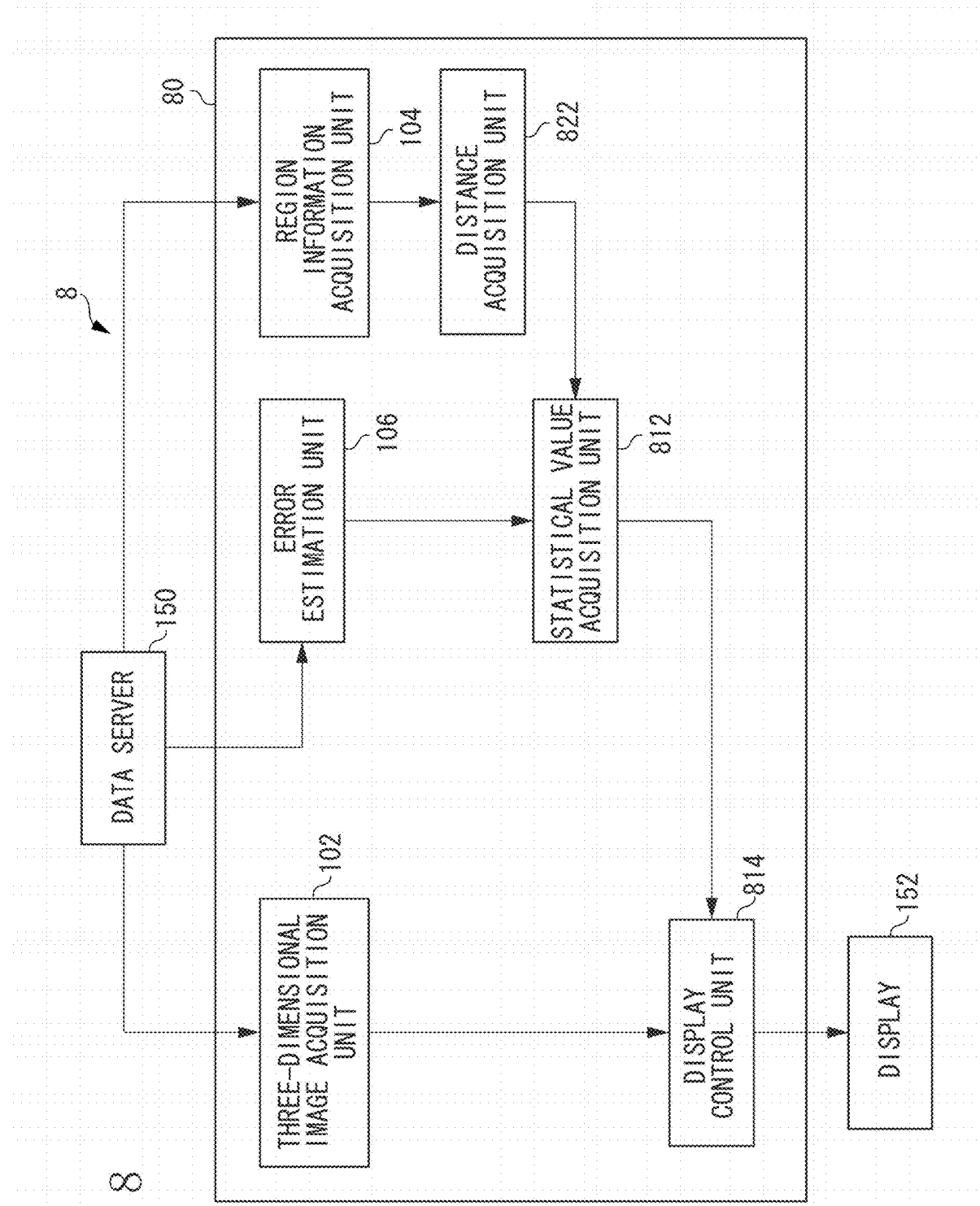
FIG. 8 illustrates an example of a functional configuration of an image processing apparatus according to one or more aspects of the present disclosure.

FIG. 8 illustrates a configuration of an information system 8 according to the third exemplary embodiment. As illustrated in FIG. 8, the information system 8 according to the third exemplary embodiment includes an image processing apparatus 80, the data server 150, and the display 152. Portions that are similar to those in FIG. 1 are given the same reference number or symbol, and description of the portions is omitted.

The image processing apparatus 80 includes the three-dimensional image acquisition unit 102, the region information acquisition unit 104, the error estimation unit 106, a statistical value acquisition unit 812, a display control unit 814, and a distance acquisition unit 822.

The statistical value acquisition unit 812 acquires statistical error values of registration errors in each of a plurality of regions classified based on the distance from the surface of the subject. In the present exemplary embodiment, the statistical value acquisition unit 812 acquires statistical error values with respect to a plurality of curved cross-sectional regions based on the distance from the surface of the subject.

The display control unit 814 performs control to display the statistical error values on the display 152. Further, the display control unit 814 performs control to display the deformed image on the display 152.

The distance acquisition unit 822 acquires a distance from the position of each voxel of the internal region to the predetermined region. In the present exemplary embodiment, the distance acquisition unit 822 acquires the distances using the surface of the subject as a reference position.

Figure 9:
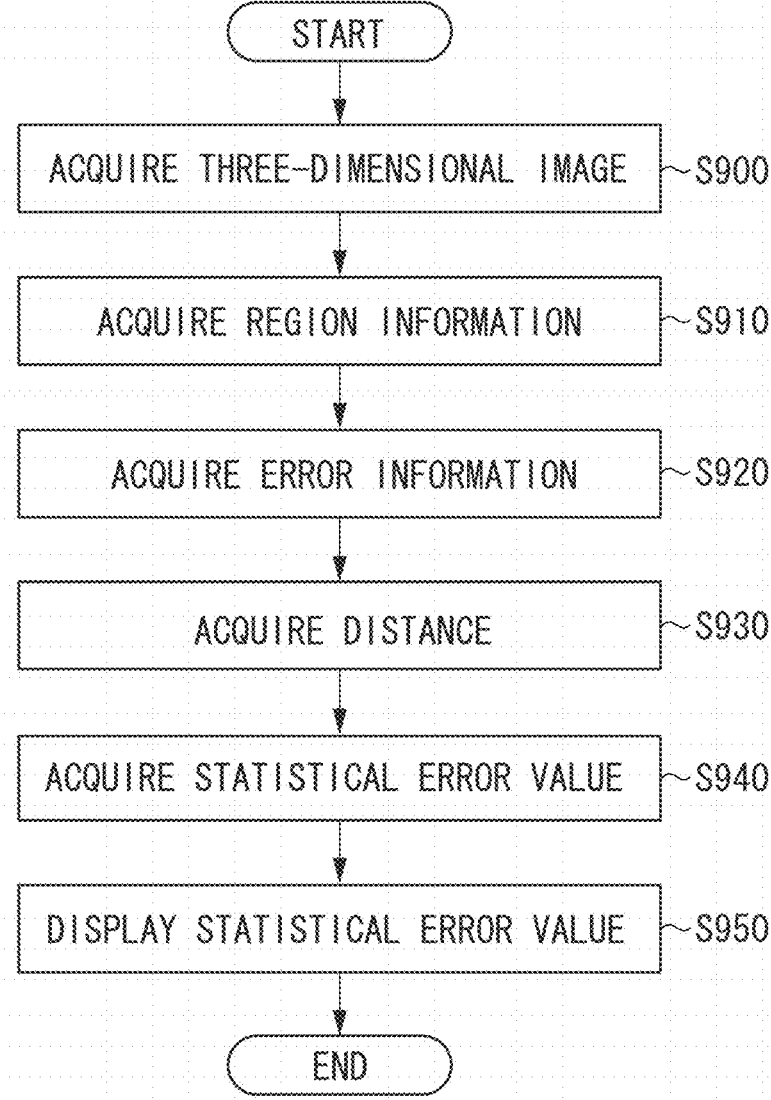
FIG. 9 is a flow chart illustrating an example of processing performed by the image processing apparatus according to one or more aspects of the present disclosure.

FIG. 9 is a flow chart illustrating an example of processing performed by the image processing apparatus 80. The image processing apparatus 80 acquires statistical error values with respect to a plurality of regions according to respective distances from the surface of the subject. Steps S900 to S920 are similar to steps S200 to S220 in the first exemplary embodiment, so description of steps S900 to S920 is omitted.

In step S930, the distance acquisition unit 822 acquires distances from the predetermined region to respective voxel positions in the internal region inside the surface of the subject that is acquired in step S910. In other words, the distance acquisition unit 822 acquires the distances from the surface of the subject. Information indicating the surface of the subject can be acquired by performing publicly-known processing on the label image that is acquired in step S910 and represents the internal region inside the surface of the subject. Then, the distance acquisition unit 822 transmits the acquired distances to the statistical value acquisition unit 812.

In step S940, the statistical value acquisition unit 812 acquires statistical error values of registration errors in each of a plurality of regions, i.e., curved cross-sectional regions in the present exemplary embodiment, classified based on the distances from the predetermined region, which are acquired in step S930. Then, the statistical value acquisition unit 812 transmits the acquired information to the display control unit 814.

Specifically, first, the statistical value acquisition unit 812 calculates the number of voxels N10 in the curved cross-sectional region with a distance of 0 to 10 mm from the surface of the subject based on the distances of the respective voxel positions from the surface of the subject that are acquired in step S930. Next, the statistical value acquisition unit 812 acquires voxel values of respective voxels in the curved cross-sectional region in the error image that is with a distance of 0 to 10 mm from the surface of the subject, i.e., registration errors, and acquires a total T10 of the registration errors. Then, the statistical value acquisition unit 812 divides the total T10 by the number of voxels N10 to acquire a mean value of the registration errors in the curved cross-sectional region with a distance of 0 to 10 mm from the surface of the subject. Similarly, the statistical value acquisition unit 812 acquires statistical error values such as a standard deviation, maximum value, median value, and a histogram of the registration errors using a publicly-known method.

Further, the statistical value acquisition unit 812 acquires statistical values of estimated values of registration errors in the curved cross-sectional region with a distance of 10 mm or more but less than 20 mm from the surface of the subject, in the curved cross-sectional region with a distance of 20 mm or more but less than 30 mm from the surface of the subject, and in the curved cross-sectional region with a distance of 30 mm or more from the surface of the subject, as in the case of the curved cross-sectional region with a distance of 0 to 10 mm from the surface of the subject.

In step S950, the display control unit 814 performs control to display the statistical error values on the display 152. Further, the display control unit 814 may perform control to display the third three-dimensional images acquired in step S900 on the display 152. At this time, the display control unit 814 may display the statistical error values acquired in step S940 in association with the third three-dimensional images on the display 152.

Figure 10:
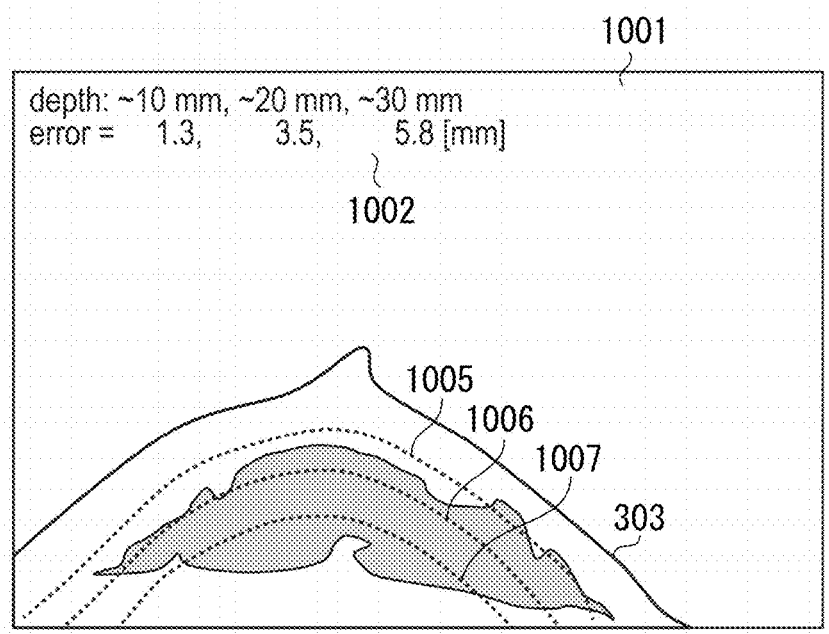
FIG. 10 illustrates an example of a screen displayed by the image processing apparatus according to one or more aspects of the present disclosure.

FIG. 10 illustrates an example of a third three-dimensional image 1001 of a subject and statistical values 1002 of estimated error values associated with the third three-dimensional image 1001, which are displayed on the display 152. In FIG. 10, a projection image (MIP image) is displayed in which the maximum value of voxel values in the range of thickness of the entire third three-dimensional image 1001, i.e., in the slab, is projected onto an axial cross section. Dotted lines 1005, 1006, and 1007 in FIG. 10 respectively indicate lines with distances of 10 mm, 20 mm, and 30 mm from a region of interest 303, which is the surface of the subject. Further, the statistical values 1002 of estimated values of registration errors for the respective distances are illustrated in FIG. 10. While the case in which one of the plurality of statistical values (e.g., median value, mean value) is selectively displayed as the statistical value of the estimated error values is described as an example in FIG. 10, it is not limited thereto, and the plurality of statistical values may be displayed simultaneously.

According to the third exemplary embodiment, the statistical values of the estimated values of registration errors can be acquired according to the respective distances from the predetermined region. This enables a user to understand with ease the relationship between the distances from the predetermined region and the registration errors.

According to the present exemplary embodiment, a user can understand with ease an overall trend in registration errors in a target cross section based on statistical values of estimated error values.

[Modified Example]

While the output unit is omitted from the functional configuration of the image processing apparatus according to the third exemplary embodiment, the image processing apparatus 60 may include the output unit configured to output to the data server 150 the statistical error values acquired by the statistical value acquisition unit 812, as in the first exemplary embodiment.

While the case in which the predetermined region is the surface of the subject is described as an example in the third exemplary embodiment, it is not limited thereto, and the predetermined reference may be a characteristic plane such as a plane of the pectoralis major muscle of the subject or a characteristic point such as the position of a lesion. Further, for example, in the case where the subject is a breast, the predetermined region may be the position of a nipple. In this case, statistical values of estimated values of registration errors are acquired according to respective distances from the nipple.

Further, in the case where a cross-sectional image of a three-dimensional image is displayed as in the first exemplary embodiment, statistical error values of intersection regions where the curved cross-sectional regions and the displayed cross section intersect may be displayed. In this case, intersection regions where the curved cross-sectional regions respectively intersect with the displayed cross section may be acquired and statistical error values of the intersection regions may be acquired in step S940.

An exemplary embodiment of the present disclosure can also be realized by supplying a program for realizing one or more functions of the exemplary embodiments described above to a system or apparatus via a network or storage medium and causing one or more processors in a computer of the system or apparatus to read and execute the program. Further, an exemplary embodiment of the present disclosure can also be realized by a circuit (e.g., application specific integrated circuit (ASIC)) that realizes one or more functions.

Each of the information processing apparatuses according to the exemplary embodiments described above may be realized in the form of a single apparatus or in the form of a plurality of apparatuses connected to each other in a communicable manner to execute processing described above, and both of the configurations are included in the scope of exemplary embodiments of the present disclosure. The processing described above may be executed by a common server apparatus or a group of servers. The plurality of apparatuses included in the image processing apparatus and image processing system may be any apparatuses as long as they are capable of communicating with each other at a predetermined communication rate, and the apparatuses are not required to be within the same facility or country.

The exemplary embodiments of the present disclosure include an exemplary embodiment in which a program of software for realizing a function of the exemplary embodiments described above is supplied to a system or apparatus and a computer of the system or apparatus reads and executes codes of the supplied program.

Accordingly, processing according to the exemplary embodiments can be realized by the computer, so program codes installed in the computer are also one of the exemplary embodiments of the present disclosure. Further, an operating system (OS) running on the computer may execute a part or all of actual processing based on an instruction included in the program read by the computer, whereby a function of the exemplary embodiments described above can be realized by the processing.

Any combination of the exemplary embodiments described above is included in the exemplary embodiments of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2015-244647, filed Dec. 15, 2015, which is hereby incorporated by reference herein in its entirety.

What is claimed is:

1. An image processing apparatus comprising:
an estimated value acquisition unit configured to acquire, for each of a plurality of positions in a target image, an estimated value of an error in registration between a plurality of three-dimensional images, wherein the target image is one of the plurality of three-dimensional images and a registered three-dimensional image acquired by the registration;
a designating unit configured to designate a target cross section in one of the plurality of three-dimensional images and the registered three-dimensional image;
a specifying unit configured to specify, as a region of interest, a region contained in the target image, wherein the region of interest is a three-dimensional region;
a statistical value calculation unit configured to acquire an intersection region that is a region where the target cross section and the region of interest cross each other, and to calculate a statistical value of the estimated values in the intersection region, using the estimated values at a plurality of positions in the intersection region; and
a display control unit configured to display the statistical value on a display unit.

2. The image processing apparatus according to claim 1, wherein the estimated value acquisition unit is configured to acquire an estimated value of an error in deformable registration between a first three-dimensional image and a second three-dimensional image.

3. The image processing apparatus according to claim 1, further comprising:
a generating unit configured to generate a cross-sectional image of the target cross section of the registered three-dimensional image; and configured to generate a projection image onto which a maximum value or minimum value of a luminance value within a predetermined range of thickness in the target image is projected, and
wherein the statistical value calculation unit is configured to calculate a statistical value of an error in the projection image based on the estimated value acquired by the estimated value acquisition unit with respect to a position corresponding to the luminance value included in the projection image.

4. The image processing apparatus according to claim 2, further comprising:
a generating unit configured to perform deformable registration between the first three-dimensional image and the second three-dimensional image.

5. The image processing apparatus according to claim 1, further comprising:
a generating unit configured to generate a cross-sectional image of the target cross section of the registered three-dimensional image; and
an accepting unit configured to accept a change in correspondence information of the generated cross-sectional image of the target cross section, the correspondence information being a corresponding position between the plurality of three-dimensional images,
wherein in a case where the accepting unit has accepted a change in the correspondence information,
the estimated value acquisition unit is configured to acquire the estimated value based on the changed correspondence information,
the statistical value calculation unit is configured to calculate the statistical value of the acquired estimated value based on the changed correspondence information, and
the display control unit is configured to update a display on the display unit so as to display the statistical value of the acquired estimated value based on the changed correspondence information.

6. The image processing apparatus according to claim 1, wherein the designating unit is configured to designate the target cross section based on a distance from a predetermined region included in the registered three-dimensional image.

7. The image processing apparatus according to claim 1, wherein, in a case where a region of interest in the target cross section has been specified, the display control unit is configured to display the statistical value of the region of interest.

8. The image processing apparatus according to claim 1, further comprising an output unit configured to output the statistical value in association with the target cross section.

9. The image processing apparatus according to claim 1, wherein the statistical value calculation unit is configured to calculate the statistical value based on information of a corresponding point included in the plurality of three-dimensional images.

10. The image processing apparatus according to claim 1, wherein the statistical value includes at least one of a mean value, a median value, a maximum value, and a minimum value.

11. The image processing apparatus according to claim 1, wherein the display control unit is configured to display on the display unit the target cross section and the statistical value in association with each other.

12. The image processing apparatus according to claim 1, wherein a subject is a breast.

13. An image processing method comprising the steps of:
acquiring, for each of a plurality of positions in a target image, an estimated value of an error in registration between a plurality of three-dimensional images, wherein the target image is one of the plurality of three-dimensional images and a registered three-dimensional image acquired by the registration;
designating a target cross section in one of the plurality of three-dimensional images and the registered three-dimensional image;
specifying, as a region of interest, a region contained in the target image, wherein the region of interest is a three-dimensional region;
acquiring an intersection region that is a region where the target cross section and the region of interest cross each other;
calculating a statistical value of the estimated values in the intersection region, using the estimated values at a plurality of positions in the intersection region; and
displaying the statistical value on a display unit.

14. A non-transitory computer-readable storage medium for causing a computer to execute:
processing to acquire, for each of a plurality of positions in a target image, an estimated value of an error in registration between a plurality of three-dimensional images, wherein the target image is one of the plurality of three-dimensional images and a registered three-dimensional image acquired by the registration;
processing to designate a target cross section in one of the plurality of three-dimensional images and the registered three-dimensional image;
processing to specify, as a region of interest, a region contained in the target image, wherein the region of interest is a three-dimensional region;
processing to acquire an intersection region that is a region where the target cross section and the region of interest cross each other;
processing to calculate a statistical value of the estimated values in the intersection region, using the estimated values at a plurality of positions in the intersection region; and
processing to display the statistical value on a display unit.

15. The image processing apparatus according to claim 1, wherein the statistical value calculation unit is configured to calculate, as the statistical value, a mean value of the estimated values by dividing a total of the estimated values at the plurality of positions by a number of the positions.

* * * * *